Patented Apr. 1, 1924.

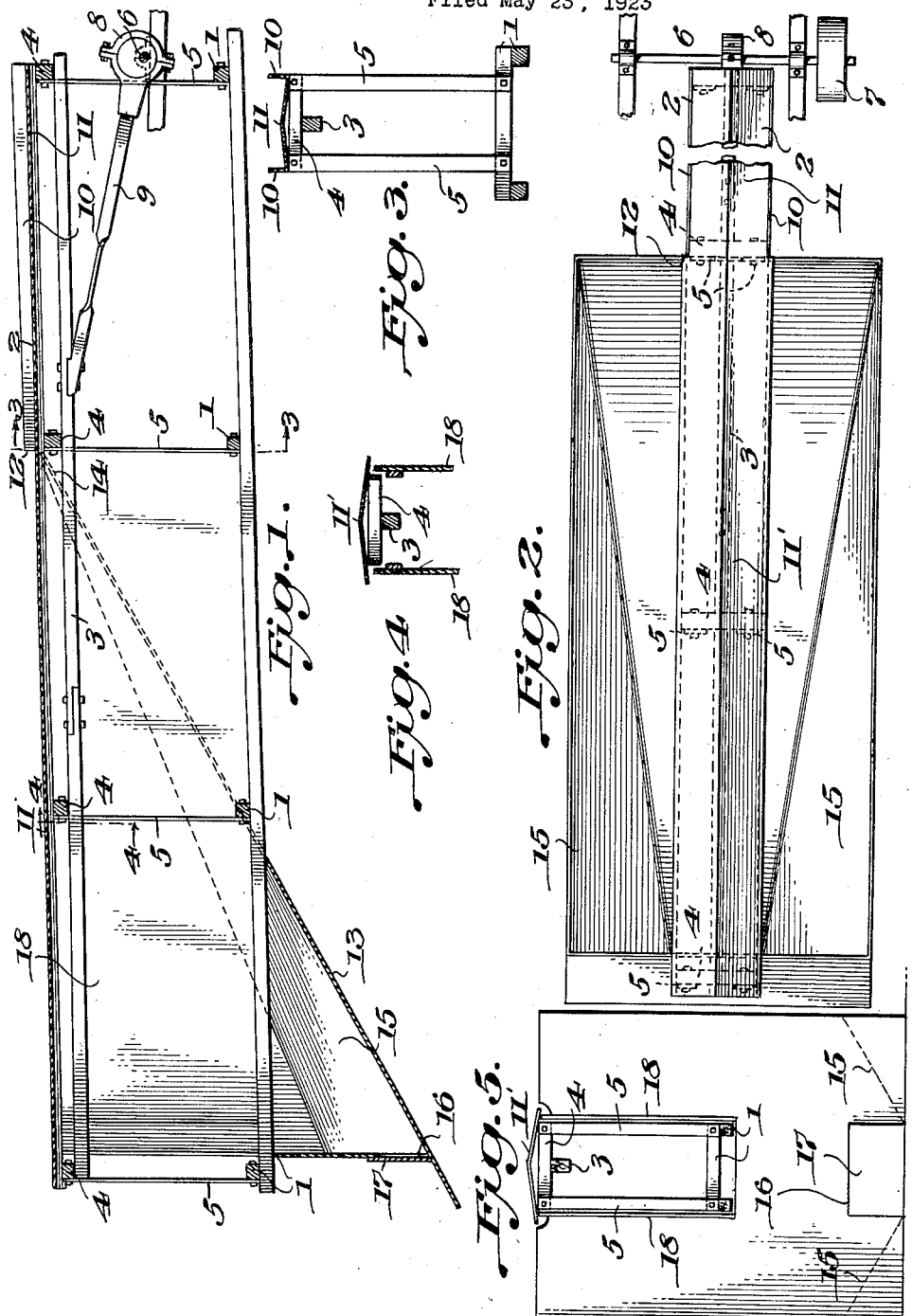

1,488,707

UNITED STATES PATENT OFFICE.

ARCHIE L. PARRISH AND JOHN H. LAMOREUX, OF KINGSTON, PENNSYLVANIA.

SHAKING CONVEYER AND BIN.

Application filed May 23, 1923. Serial No. 640,880.

*To all whom it may concern:*

Be it known that we, ARCHIE L. PARRISH and JOHN H. LAMOREUX, citizens of the United States, residing at Kingston, in the county of Luzerne and State of Pennsylvania, have invented certain new and useful Improvements in Shaking Conveyers and Bins, of which the following is a specification.

This invention relates to that general class of conveyers which shake or oscillate for the purpose of advancing coal or other friable material, and to a storage bin, or pocket to which the conveyer delivers the material.

The usual type of chain drag, screw conveyer, gravity chute, or other conveyer employed for the purpose of delivering coal and other friable material to a given receptacle as, for instance, a storage bin, is productive of considerable breakage due to excessive speed, the character of the conveyer, and the impact on the material and its dropping into the bin or receptacle.

Bins with which we are familiar are not adapted for the flow of the coal or other material en masse at all times when the material is drawn from the bin and such bins have "dead" corners or parts in which dirt and impurities accumulate until, finally, these pocketed quantities pass, in a large mass, into the material being loaded and by mingling with it, render it unfit for marketing.

The purpose of our invention is to overcome the foregoing, and other not specifically mentioned, defects inhering in conveyers and storage bins such as have heretofore been commonly employed for coal and other friable material. We accomplish this object by the provision of, first, an improved shaking conveyer; second, an improved bin; third, the combination of our improved shaking conveyer, and bin.

The shaking conveyer or chute is provided with sides extending for a portion of its length to the point where the coal or other material is to be discharged, and having a bottom which is higher at its central part than at those parts adjoining the sides, whereby the coal or other material being carried forward by the chute or conveyer will tend to distribute itself along the sides thereof and upon reaching the ends of the sides, will pass off the edges of the conveyer and into the bin.

The bin has an inclined bottom arranged at a proper angle so that the material will feed by gravity toward such outlet as may be provided and has sides which are inclined to effectuate this feed. The bin is also provided with partitions which are combined with that part of the shaking conveyer or chute that has no sides such as previously described, thereby preventing the material which is being handled from coming in contact with the movable supports for the chute.

In operation, the improved combination existing between the shaking chute or conveyer and the bin causes the material in the bin to gradually pile up at its natural angle of repose and form temporary sides along the exposed edges of the shaking chute, along which temporary sides, material subsequently advanced by the chute passes until it, in turn, slides off the exposed edges of the chute upon reaching a point above the unfilled spaces in the bin. Thus, once the first, or bottom, layer of material has slid down the bin, the material shaken forward by the chute begins to pile up at the upper part of the bin and to be progressively advanced forwardly of the bin until the bin is full. This method of operation minimizes breakage of the coal or other friable material being handled because the only breakage that is possible is that which may occur when the first flow of material passes from the ends of the sides of the shaking chute into the empty bin. Thus liability of breakage is minimized after the bin has first been filled because the holding capacity of a bin of this character is usually greater than that of the car or other conveyance into which the material is loaded and, consequently, the bin is seldom drawn entirely empty. After the first layer of material has accumulated in the bottom of the bin, the succeeding pieces or lumps of the coal or other material fall only a short distance and are thus not liable to breakage.

A practical embodiment of our invention is set forth hereinafter but it is to be understood that this is by way of illustration and not in limitation of the invention as we are aware that modifications may be resorted to without departing from the essential principles of the invention.

In the accompanying drawings:
Figure 1 is a side elevation;
Fig. 2 is a plan view;
Fig. 3 is a vertical section on the line 3—3, Fig. 1;
Fig. 4 is a similar view on the line 4—4, Fig. 1; and
Fig. 5 is an end elevation.

The base frame 1 is composed of longitudinal and cross timbers, the said frame being suitably inclined.

A vibrator or shaking conveyer or chute 2 is provided with a central longitudinally extending beam 3 to which are fastened at suitable intervals cross beams 4. The chute framework is carried by vertically arranged spring boards 5 which are secured at their lower ends to the cross timbers of the frame 1 and at their upper ends to the cross pieces 4: thus, the chute 2 is mounted so that it may be shaken to and fro by any suitable means, for instance a shaft 6 driven by the belt pulley 7 and carrying eccentric 8 which is connected to the beam 3 by a flexible pitman 9.

From its receiving end (right hand end, Fig. 1), to the point where it discharges into the bin hereinafter described, the chute 2 is provided with sides 10.

Throughout its length the chute has a bottom of more or less "turtle-back" form whose edges terminate at the sides 10 for that portion of the length of the chute which is provided with the sides 10 as shown at 11, Fig. 3. The remainder of the chute is devoid of sides and its bottom is continued in turtle-back form as shown at 11', Fig. 4, the edges of the bottom projecting beyond the cross pieces 4 as shown in Fig. 4.

The chute bottom is preferably formed of sloping parts, meeting in a ridge, as indicated in Figs. 3 and 4, but it is within the spirit of the invention to employ any construction which is of general convex formation, the purpose being to cause the coal or other material being handled to move toward the edges of the bottom 11, 11'. For that portion of the length of the chute which is provided with sides 10, the effect of the shaking or vibration of the chute is to cause the coal or other material to form into streams on the two sides of the chute, said streams being fed forwardly until the forward ends 12 of the sides 10 are reached, whereupon the coal is discharged.

The bin has an inclined bottom 13 onto whose right hand part 14 is discharged the material passing off of the chute at 12. This bottom is flanked by sloping sides 15. Consequently the bin construction is such that all of the material discharged therein tends to gravitate toward the outlet 16 which is provided with any suitable closure 17 and there are no "dead" corners or pockets to accumulate dirt in quantities and afterward permit the discharge thereof into the clean material as is a common defect in ordinary bins.

Partitions 18 extend the full length of the bin from the point 12 to the left hand end thereof, said partitions rising from the base frame 1 and extending upwardly until their upper edges are close to the overhanging edges of the bottom 11', as shown in Fig. 4. Thus, while the material discharged into the bin is prevented from coming in contact with the moving parts of the chute, including the spring boards 5, no interference occurs with the free shaking action of the chute as the turtle-back 11' moves freely over the upper edges of the partitions 18, thus enabling the coal or other material to shake off from the overhanging edges of the section 11' into the bin in a manner which will now be described.

Coal or other material discharged onto the shaking chute is first received on the section 11 of the turtle-back or bottom and spreads laterally against the sides 10. The chute being arranged on a suitable incline, the material is moved forwardly until it reaches the point 12 where it then spills onto the upper part of the inclined bottom 13 and slides down said bottom to the lower part of the bin. When the bottom of the bin is covered, the material will begin piling at its natural angle of repose and build up in the form of temporary sides, along which the material that follows by the shaking action of the chute, will pass and in its turn slide off the edges of the section 11' of the bottom. This method of filling the bin continues until the bin is full, it being understood that the built up material continually progresses toward the left in the bin, Fig. 1, until the bin is finally completely filled.

The only breakage which can occur is during the initial flow of the material from the chute at the point 11. However, except when the bin is first filled, little breakage will occur as the bin is usually of a greater capacity than that of any car or other conveyance into which it will be drawn on opening the closure 17. When the bin begins to fill, the piled up material along the edge of the section 11' forms a temporary side along which the following material passes with a rolling or turning movement until it reaches the unfilled space where it slides off the pile with practically no drop.

Inasmuch as the chute is wholly supported from below, instead of being suspended, the chute is entirely unobstructed and free delivery of the material results.

Our improved shaking chute may be used in connection with bins which have previously been constructed or in connection with bins constructed in any shape to suit local conditions.

We claim the chute alone and, also, the chute in combination with the bin.

We claim:

1. A shaking conveyer provided with sides for a part of its length, its remaining part having free edges for the discharge of the material, in combination with a bin whose receiving part is in the region of the termini of the sides of the conveyer, said bin being disposed under the remaining part of the conveyer.

2. A shaking conveyer provided with sides for a part of its length, its remaining part having free edges for the discharge of the material, said conveyer having a convex or "turtle-back" bottom throughout its length, in combination with a bin whose receiving part is in the region of the termini of the sides of the conveyer, said bin being disposed under the remaining part of the conveyer.

3. The combination with a shaking conveyer which is supported from beneath for vibratory action and is provided with sides for a part of its length, its remaining part having free edges for the discharge of the material, of a bin located below that part of the conveyer which has free edges and arranged with its receiving portion adapted to receive the discharge from the conveyer in the region of the termini of the sides aforesaid, and means for housing those supports for the conveyer which are disposed within the bin so that their action will not be hindered.

4. The combination with a shaking conveyer which is supported from beneath for vibratory action and is provided with sides for a part of its length, its remaining part having free edges for the discharge of the material, of a bin located below that part of the conveyer which has free edges and arranged with its receiving portion adapted to receive the discharge from the conveyer in the region of the termini of the sides aforesaid, and partitions in the bin which house the supports therein for the conveyer, said partitions extending upwardly to the region of the free edges of the conveyer.

5. A shaking conveyer provided with sides for a part of the length, its remaining part having free edges for the discharge of the material, in combination with a bin whose receiving part is in the region of the termini of the sides of the conveyer, said bin having an inclined bottom whose highest part is adapted to receive the material discharged from the termini of the sides of the conveyer, the bin also having inclined sides and being disposed under the remaining part of the conveyer.

6. The method of storing and confining material in a bin consisting in delivering the material thereto from a shaking conveyer by initially directing streams of the material from the opposite edges of the discharge part of the conveyer to the receiving end of the bin and by the successive accretions of material in the bin, building up walls of material along the edges of the conveyer in a constantly progressing manner toward the end thereof and continuing to fill the bin by delivering the material from the conveyer along said walls of built up material until such delivered material drops beyond the previously built up walls, and continuing this operation until the bin has been filled to the desired extent.

In testimony whereof we affix our signatures.

ARCHIE L. PARRISH.
JOHN H. LAMOREUX.